United States Patent
Hoyles et al.

(10) Patent No.: US 10,876,032 B2
(45) Date of Patent: *Dec. 29, 2020

(54) METHOD FOR RECOVERING HYDROCARBON FLUIDS FROM A SUBTERRANEAN RESERVOIR USING ALPHA-GLYCOL CONTAINING SULFONATED EPOXY RESIN COMPOUND

(71) Applicant: Dow Global Technologies LLC, Midland, MI (US)

(72) Inventors: Stephen M. Hoyles, Lake Jackson, TX (US); Robert E. Hefner, Jr., Rosharon, TX (US)

(73) Assignee: Dow Global Technologies LLC, Midland, MI (US)

( * ) Notice: Subject to any disclaimer, the term of this patent is extended or adjusted under 35 U.S.C. 154(b) by 101 days.

This patent is subject to a terminal disclaimer.

(21) Appl. No.: 16/310,228

(22) PCT Filed: Jun. 26, 2017

(86) PCT No.: PCT/US2017/039238
§ 371 (c)(1),
(2) Date: Dec. 14, 2018

(87) PCT Pub. No.: WO2018/005343
PCT Pub. Date: Jan. 4, 2018

(65) Prior Publication Data
US 2019/0153295 A1   May 23, 2019

Related U.S. Application Data

(60) Provisional application No. 62/355,969, filed on Jun. 29, 2016.

(51) Int. Cl.
*C09K 8/508* (2006.01)
*C08G 59/14* (2006.01)

(52) U.S. Cl.
CPC .......... *C09K 8/508* (2013.01); *C08G 59/1483* (2013.01); *C08G 59/1494* (2013.01); *C09K 8/5086* (2013.01)

(58) Field of Classification Search
CPC ... C09K 8/508; C09K 8/5086; C08G 59/1483
See application file for complete search history.

(56) References Cited

U.S. PATENT DOCUMENTS

| | | | |
|---|---|---|---|
| 3,306,872 A | 2/1967 | Maycock et al. | |
| 3,341,580 A | 9/1967 | Hechenbleikner | |
| 3,379,684 A | 4/1968 | Wiesner | |
| 3,477,990 A | 11/1969 | Dante et al. | |
| 3,547,881 A | 12/1970 | Mueller et al. | |
| 3,637,590 A | 1/1972 | Maycock | |
| 3,727,691 A * | 4/1973 | Muecke | E21B 33/13 166/295 |
| 3,843,605 A | 10/1974 | Schmidt et al. | |
| 3,948,855 A | 4/1976 | Perry | |
| 3,956,237 A | 5/1976 | Doorakian et al. | |
| 4,048,141 A | 9/1977 | Doorakian et al. | |
| 4,093,650 A | 6/1978 | Doorakian et al. | |
| 4,131,633 A | 12/1978 | Doorakian et al. | |
| 4,132,706 A | 1/1979 | Doorakian et al. | |
| 4,171,420 A | 10/1979 | Doorakian et al. | |
| 4,177,216 A | 12/1979 | Doorakian et al. | |
| 4,317,757 A | 3/1982 | Kooijmans et al. | |
| 4,366,295 A | 12/1982 | Tyler, Jr. et al. | |
| 4,379,872 A | 4/1983 | Ishikura et al. | |
| 4,467,257 A * | 8/1984 | Douthart | H02P 25/20 318/774 |
| 6,569,983 B1 | 5/2003 | Treybig et al. | |
| 7,417,011 B2 | 8/2008 | Treybig et al. | |
| 7,678,872 B2 | 3/2010 | Glass et al. | |
| 7,893,136 B2 | 2/2011 | Glass et al. | |
| 2005/0059794 A1 | 3/2005 | Glass et al. | |
| 2005/0065036 A1 | 3/2005 | Treybig et al. | |

OTHER PUBLICATIONS

Wang, X., et. al., "Hot Water-Promoted Ring-Opening of Epoxides and Aziridines by Water and Other Nucleoplites," Journal of Organic Chemistry, 2008, p. 2270-2274, v. 73.

(Continued)

*Primary Examiner* — Silvana C Runyan

(57) ABSTRACT

Disclosed is a composition and use thereof for the recovery of hydrocarbon fluids from a subterranean reservoir. More particularly, this invention concerns α-glycol containing sulfonated epoxy resin composition and method for preparing said composition. The α-glycol containing sulfonated epoxy resin composition is made by forming a reaction product comprising an epoxide-containing compound, a primary amino sulfonate, and optionally one or more of a primary monoamine alkylene oxide oligomer, followed by converting any unreacted epoxide groups in the reaction product to α-glycol groups by hydrolysis. Said α-glycol containing sulfonated epoxy resin compositions demonstrate good solubility in aqueous solutions and are useful for modifying the permeability of subterranean formations and increasing the mobilization and/or recovery rate of hydrocarbon fluids present in the formations.

10 Claims, No Drawings

(56) References Cited

OTHER PUBLICATIONS

Salehi, P., et. al., "Ferric Perchlorate: An Efficient Reagent for Regio- and Stereoselective Alcoholysis and Hydrolysis of Epoxides," Synthetic Communications, 2000, p. 2967-2973, v. 30, No. 16.
Salehi, P., et. al., "Solvent Effects in the Oxidation of Sulfides with NaBrO3/Mg(HSO4)2," Synthetic Communications, 2003, p. 2935-2944, v. 33, No. 17.
Mohammadpoor-Baltork, I., et. al., "Bismuth(III) Chloride (BiCl3); An Efficient Catalyst for Mild, Regio- and Stereoselective Cleavage of Epoxides with Alcohols, Acetic Acid and Water," Synthetic Communications, 2000, p. 2365-2374, v. 30, No. 13.
Iranpoor, N., et. al.,"Ceric Ammonium Nitrate, An Efficient Catalyst for Mild and Selective Opening of Epoxides in the Presence of Water Thiols and Acetic Acid," Tetrahedron, 1991, p. 9861-9866, v. 47, No. 47.
Parker, R. E., et. al., "Mechanisms of Epoxide Reactions," Chemical Reviews, 1959, p. 737-799, v. 59, No. 4.
Mirkhani, V., et. al., "Efficient regio- and stereoselective ring opening of epoxides with alcohols, acetic acid and water catalyzed by ammonium decatungstocerate(IV)," Tetrahedron, 2003, P. 8213-8218, v. 59.
Iranpoor, N., et. al., "Iodine and iodine supported on polyvinylpyrrolidone as catalysts and reagents for alcoholysis, hydrolysis, and acetolysis of epoxides and thiiranes," Canadian Journal of Chemistry, 1997, p. 1913-1919, v. 75.
Yadav, et. al., Synthesis, 2005, p. 1897, v. 17.
Olah, et. al., Synthesis, 1981, p. 280, v. 4.

* cited by examiner

METHOD FOR RECOVERING HYDROCARBON FLUIDS FROM A SUBTERRANEAN RESERVOIR USING ALPHA-GLYCOL CONTAINING SULFONATED EPOXY RESIN COMPOUND

FIELD OF THE INVENTION

This invention relates to water soluble α-glycol containing sulfonated epoxy resin composition and provides a method for preparing said polymer. The invention also relates to methods for the recovery of hydrocarbon fluids from a subterranean reservoir using said composition for modifying the permeability of subterranean formations to aqueous-based fluids and increasing the mobilization and/or recovery rate of hydrocarbon fluids present in the formations.

BACKGROUND OF THE INVENTION

The production of large amounts of water from oil and gas wells constitutes one of the major expenses in the overall recovery of hydrocarbons from a subterranean formation. Many producing oil wells produce a gross effluent having greater than 80% by volume water. Therefore, most of the pumping energy is expended by lifting water from the well. Then the production effluent must be subjected to expensive separation procedures in order to recover water-free hydrocarbons. The water constitutes a troublesome and an expensive disposal problem.

Therefore, it is highly desirable to decrease the amount of water produced from oil and gas wells. Another beneficial effect of decreasing the amount of produced water is realized by decreasing the flow of water in the well bore at a given pumping rate thereby lowering the liquid level over the pump in the well bore, thereby reducing the back pressure in the formation and improving pumping efficiency and net daily oil production.

SUMMARY OF THE INVENTION

The present invention is a method of modifying the permeability to water of a subterranean formation comprising the step of injecting into the subterranean formation an aqueous composition comprising from about 0.005 percent to about 2 percent, by weight, of an α-glycol containing sulfonated epoxy resin composition made by the method comprising the steps of: (A) forming a sulfonated epoxy resin polymer reaction product by reacting (i) an epoxide-containing compound having an average of more than one epoxide group per molecule, (ii) a primary amino sulfonate, (iii) optionally a primary monoamine alkylene oxide oligomer, and (iv) optionally an epoxide reactive compound selected from the group consisting of a primary monoamine, a secondary diamine, a monohydroxyalkyl primary monoamine, a dihydroxyalkyl primary monoamine, a trihydroxyalkyl primary monoamine, a monohydroxycycloalkyl primary monoamine, a dihydroxycycloalkyl primary monoamine, and a trihydroxycycloalkyl primary monoamine and (B) converting all or part of the unreacted epoxy groups in the reaction product from step (A) to α-glycol groups by hydrolysis.

In one embodiment of the method of the present invention described herein above, the epoxide-containing compound (i) is represented by the formula:

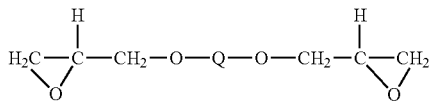

where Q is selected from a divalent aromatic group —Ar—; Ar-L-Ar, wherein L is selected from a direct bond, $C_1$ to $C_8$ alkylene, —$SO_2$—, —S—, >C=O, or —O—; a divalent cycloaliphatic group K having from 4 carbons to 8 carbons, or —$R_1$—K—$R_2$— where $R_1$ and $R_2$ are independently a $C_1$ to $C_3$ alkylene group, preferably the epoxide-containing compound is selected from a diglycidyl ether of 4,4'-isopropylidenediphenol (bisphenol A); cis-1,3-cyclohexanedimethanol; trans-1,3-cyclohexanedimethanol; cis-1,4-cyclohexanedimethanol; or trans-1,4-cyclohexanedimethanol; the primary amino sulfonate (ii) is represented by the formula:

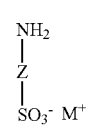

wherein Z is an aliphatic, cycloaliphatic, polycycloaliphatic, or aromatic hydrocarbon group optionally substituted with one or more alkyl groups and M is any monovalent cation, preferably the primary amino sulfonate is selected from sulfanilic acid, sodium salt; sulfanilic acid, potassium salt; aminomethanesulfonic acid, sodium salt; or aminomethanesulfonic acid, potassium salt; and if present, the primary monoamine alkylene oxide oligomer (iii) is represented by the formula:

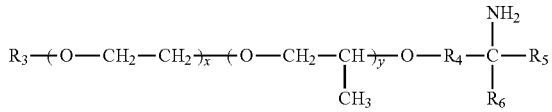

wherein $R_3$ is —H, $C_1$ to $C_{12}$ alkyl or cycloalkyl, $R_4$ is a covalent bond, $C_1$ to $C_{12}$ alkyl or cycloalkyl, $R_5$ and $R_6$ are independently —H, $C_1$ to $C_{12}$ alkyl or cycloalkyl, and x and y independently have a value from 0 to 400, preferably the primary monoamine alkylene oxide oligomer $R_3$ and $R_5$ are —$CH_3$, $R_4$ is —$CH_2$—, $R_6$ is —H, and x and y independently have a value from 0 to 75 with the proviso that at least one of x or y is equal to or greater than 1.

In one embodiment of the method of the present invention described herein above, the equivalent ratio of epoxide reactive groups in the primary amino sulfonate (ii), the optional primary monoamine alkylene oxide oligomer (iii), and the optional epoxide reactive compound (iv) to epoxide groups in the epoxide-containing compound (i) is 0.25:1 to 0.95:1.

In one embodiment of the method of the present invention described herein above, the reaction products of claim 1 have an average molecular weight of from 300 to 100,000, and are produced preferably in a batch or continuous process.

In another embodiment of the method of the present invention the aqueous composition further comprises about

DETAILED DESCRIPTION OF THE INVENTION

One embodiment of the present invention is an α-glycol containing sulfonated epoxy resin composition and method to make said composition comprising, consisting essentially of, consisting of the steps (A) to form a sulfonated epoxy resin polymer reaction product comprising, consisting essentially of, consisting of the reaction product of an epoxy resin (i) with at least one difunctional compound with respect to reaction with the epoxide group, preferably a primary amino sulfonate (ii), and optionally a primary monoamine alkylene oxide oligomer (iii), and/or optionally an additional epoxide reactive compound (iv), and/or optionally a catalyst, and/or optionally a solvent to form a reaction product then (B) converting unreacted epoxy groups in the reaction product to α-glycol groups by hydrolysis.

The first step (A) of the process of the present invention is preparing a sulfonated epoxy resin oligomer or polymer (hereinafter "polymer") using stoichiometry which results in unreacted epoxide groups in said polymer. Component (i) of the sulfonated epoxy resin polymer of the present invention is an epoxy resin and can be an epoxide-containing compound having an average of more than one epoxide group per molecule. The epoxide group can be attached to an oxygen, a sulfur or a nitrogen atom or the single bonded oxygen atom attached to the carbon atom of a —CO—O— group. The oxygen, sulfur, nitrogen atom, or the carbon atom of the —CO—O— group may be attached to an aliphatic, cycloaliphatic, polycycloaliphatic or aromatic hydrocarbon group. The aliphatic, cycloaliphatic, polycycloaliphatic or aromatic hydrocarbon group can be substituted with one or more inert substituents including, but not limited to, alkyl groups, preferably methyl; alkoxy groups, preferably methoxy; halogen atoms, preferably fluorine, bromine or chlorine; nitro groups; or nitrile groups.

Preferred epoxide-containing compounds include the diglycidyl ethers represented by formula I:

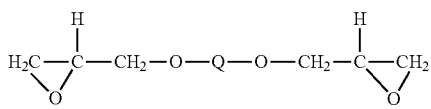

I where Q is selected from a divalent aromatic group —Ar—, Ar-L-Ar where L is selected from a direct bond, $C_1$ to $C_8$ alkylene, —$SO_2$—, —S—, >C=O, or —O—, a divalent cycloaliphatic group K having from 4 carbons to 8 carbons, or —$R_1$—K—$R_2$— where $R_1$ and $R_2$ are independently a $C_1$ to $C_3$ alkylene group.

More specific examples of the epoxide-containing compound which can be used include diglycidyl ethers of 1,2-dihydroxybenzene (catechol); 1,3-dihydroxybenzene (resorcinol); 1,4-dihydroxybenzene (hydroquinone); 4,4'-isopropylidenediphenol (bisphenol A); 4,4'-dihydroxydiphenylmethane; 3,3',5,5'-tetrabromobisphenol A; 4,4'-thiodiphenol; 4,4'-sulfonyldiphenol; 2,2'-sulfonyldiphenol; 4,4'-dihydroxydiphenyl oxide; 4,4'-dihydroxybenzophenone; 1,4-dihydroxynaphthalene; 2,6-dihydroxynaphthalene; 9,9-bis(4-hydroxyphenyl)fluorene; 2,2-bis(4-hydroxyphenyl)acetamide; 2,2-bis(4-hydroxyphenyl)-N-methylacetamide; 1,1'-bis(4-hydroxyphenyl)-1-phenylethane; 3,3'-5,5'-tetrachlorobisphenol A; 3,3'-dimethoxybisphenol A; 4,4'-dihydroxybiphenyl; 4,4'-dihydroxy-alpha-methylstilbene; 4,4'-dihydroxybenzanilide; 4,4'-dihydroxystilbene; 4,4'-dihydroxy-alpha-cyanostilbene; N,N'-bis(4-hydroxyphenyl) terephthalamide; 4,4'-dihydroxyazobenzene; 4,4'-dihydroxy-2,2'-dimethylazoxybenzene; 4,4'-dihydroxydiphenylacetylene; 4,4'-dihydroxychalcone; 4-hydroxyphenyl-4-hydroxybenzoate; dipropylene glycol; poly(propylene glycol); thiodiglycol; cis-, trans-1,3- and 1,4-cyclohexanedimethanol; cis-, trans-1,2-cyclohexanedimethanol; cis-, trans-1,3-cyclohexanedimethanol; cis-, trans-1,4-cyclohexanedimethanol; 1,1-cyclohexanedimethanol; 1,1-cyclohexanediethanol; 1,4-bis(2-hydroxyethoxy) cyclohexane; 1,4-cyclohexanediethanol; 1,4-(2-hydroxyethyloxy)cyclohexane; dicyclopentadienedimethanols, norbornenedimethanols; norbornanedimethanols; cyclooctanedimethanols; cis- and trans-2,2,4,4-tetramethylcyclobutane-1,3-diol; the triglycidyl ether of tris(hydroxyphenyl) methane; the polyglycidyl ethers of a phenol or alkyl or halogen substituted phenol-aldehyde acid catalyzed condensation product (novolac resins); the tetraglycidyl amines of 4,4'-diaminodiphenylmethane; 4,4'-diaminostilbene; N,N'-dimethyl-4,4'-diaminostilbene; 4,4'-diaminobenzanilide; 4,4'-diaminobiphenyl; the polyglycidyl ether of the condensation product of a dicyclopentadiene or an oligomer thereof and a phenol or alkyl or halogen substituted phenol; and combinations thereof.

Preferred epoxide-containing compounds are the diglycidyl ether of 4,4'-isopropylidenediphenol (bisphenol A); cis-1,3-cyclohexanedimethanol; trans-1,3-cyclohexanedimethanol; cis-1,4-cyclohexanedimethanol; and trans-1,4-cyclohexanedimethanol.

The epoxide-containing compound which can be used may also include an advanced epoxy resin. The advanced epoxy resin may be a product of an advancement reaction of an epoxy resin with an aromatic di- and polyhydroxy, or carboxylic acid-containing compound. The epoxy resin used in the advancement reaction may include one or more of the aforesaid epoxy resins and the aromatic dihydroxy and/or polyhydroxy compound may include one or more of the aforesaid precursors to the aforesaid epoxy resins.

Component (ii) of the sulfonated epoxy resin polymer of the present invention is a primary amino sulfonate represented by formula II:

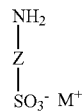

II wherein Z is an aliphatic, cycloaliphatic, polycycloaliphatic or aromatic hydrocarbon group and can be substituted with one or more inert substituents including, but not limited to, alkyl groups, preferably methyl; cycloalkyl groups, preferably cyclohexyl, and alkoxy groups, preferably methoxy, and M is any monovalent cation, particularly $Li^+$, $Na^+$, $K^+$, and $NH_4^+$.

Preferred primary amino sulfonate compounds are sulfanilic acid, sodium salt; sulfanilic acid, potassium salt; aminomethanesulfonic acid, sodium salt; and aminomethanesulfonic acid, potassium salt.

Preferably, the equivalent ratio of epoxide reactive groups in the primary amino sulfonate (ii) to epoxide groups in the epoxide-containing compound (i) is 0.25:1 to 0.95:1.

Optional component (iii) of the sulfonated epoxy resin polymer of the present invention is a primary monoamine alkylene oxide oligomer represented by the formula III:

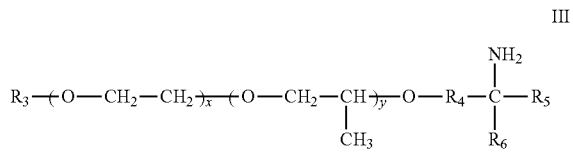

wherein $R_3$ is —H, $C_1$ to $C_{12}$ alkyl or cycloalkyl,
$R_4$ is a covalent bond, $C_1$ to $C_{12}$ alkyl or cycloalkyl,
$R_5$ and $R_6$ are independently —H, $C_1$ to $C_{12}$ alkyl or cycloalkyl, and
x and y independently have a value from 0 to 400.

Preferably, the length of the polyalkylene oxide chain(s) are independently from 0 alkylene oxide unit to 400 alkylene oxide units, preferably from 1 alkylene oxide units to 250 alkylene oxide units, more preferably from 2 alkylene oxide units to 200 alkylene oxide units and, most preferably, from 3 alkylene oxide units to 100 alkylene oxide units.

The alkylene oxide oligomers represented by formula III may be block or random copolymers.

Preferred primary monoamine alkylene oxide oligomers are those of formula III where $R_3$ and $R_5$ are —$CH_3$, $R_4$ is —$CH_2$—, $R_6$ is —H, and x and y independently have a value from 0 to 75 with the proviso that at least one of x or y is equal to or greater than 1.

Preferably, the primary monoamine alkylene oxide oligomer is used in an amount to provide from 0.01 to 50 percent, more preferably from 0.1 to 20 percent, and most preferably, from 1 to 15 percent, of the total amine hydrogen equivalents for reaction with the epoxide equivalents of component (i), the epoxide-containing compound.

Optional component (iv) of the sulfonated epoxy resin polymer used in the present invention is one or more additional epoxide reactive compound selected from a primary monoamine, a secondary diamine, a monohydroxyalkyl primary monoamine, a dihydroxyalkyl primary monoamine, a trihydroxyalkyl primary monoamine, a monohydroxycycloalkyl primary monoamine, a dihydroxycycloalkyl primary monoamine, or a trihydroxycycloalkyl primary monoamine.

Representative additional epoxide reactive compounds include alkyl primary amines, such as butylamine; cycloalkylamines, such as aminocyclohexane; and secondary amines, such as N,N'-dimethylethylenediamine Representatives of the various aforementioned hydroxyalkyl and hydroxycycloalkyl primary monoamines include monoethanolamine, bis(hydroxymethyl)aminomethane, tris(hydroxymethyl)aminomethane, and aminocyclohexanol.

In one embodiment of the method of the present invention described herein above, when one or more of optional epoxide reactive compounds is present, the equivalent ratio of epoxide reactive groups in the primary amino sulfonate (ii), the optional primary monoamine alkylene oxide oligomer (iii), and the optional epoxide reactive compound (iv) to epoxide groups in the epoxide-containing compound (i) is 0.25:1 to 0.95:1.

A preferred process to make the sulfonated epoxy resin polymer used in the present invention comprises reacting at least one primary amino sulfonate compound (ii) with at least one epoxy resin (i) comprising the epoxide-containing compound in an equivalent ratio of 0.25:1 to 0.95:1, so as to provide an advancement reaction product containing unreacted epoxide groups. One or more optional components selected from a primary monoamine alkylene oxide oligomer (iii), an epoxide reactive compound (iv), a catalyst, and/or a solvent may also be added. The epoxy resin (i), the at least one primary amino sulfonate compound (ii), and any additional components can be added in any order, including pre-reaction of two or more components followed by addition of one or more additional components and reaction with the aforesaid pre-reaction product. The components may be added all at once or in increments. One or more components may be pre-dissolved in a suitable solvent and used as a solution in the advancement reaction. The components are mixed to form a reaction mixture which is held at room temperature or below and/or heated at a temperature and time sufficient to achieve the desired degree of advancement reaction, preferably producing an advanced epoxide resin mixture having an average molecular weight between 300 to 100,000. The method to prepare the sulfonated epoxy resin polymer can be a batch or continuous process. One or more solvents inert to the reactants and the sulfonated epoxy resin polymer product may beneficially be employed in the advancement reaction.

The temperature of the advancement reaction can be 0° C. to 150° C., preferably 20° C. to 100° C., and more preferably 25° C. to 50° C. The pressure of the advancement reaction can be 0.1 bar to 10 bar, specifically 0.5 bar to 5 bar, and more specifically 0.9 bar to 1.1 bar. The time required to complete the advancement reaction depends upon the temperature employed. Higher temperatures require shorter periods of time whereas lower temperatures require longer periods of time. Generally, however, times of from 5 minutes to about 48 hours, preferably from 30 minutes to about 36 hours, more preferably from 60 minutes to about 24 hours are suitable.

At least one catalyst can optionally be used in the advancement reaction. Catalysts for the advancement reaction can be selected from one or more of a metal salt, an alkali metal salt, an alkaline earth metal salt, a tertiary amine, a quaternary ammonium salt, a sulfonium salt, a quaternary phosphonium salt, a phosphine, and combinations thereof. The catalyst is generally employed in an amount of 0.0010 wt % to 10 wt %, specifically 0.01 wt % to 10 wt %, more specifically 0.05 wt % to 5 wt %, and still more specifically 0.1 wt % to 4 wt %, based on the total weight of the epoxy resin, primary amino sulfonate, and other components, if present.

Particularly suitable catalysts for advancement reaction include, for example, ethyltriphenylphosphonium chloride, ethyltriphenylphosphonium bromide, ethyltriphenylphosphonium iodide, ethyltriphenylphosphonium diacetate (ethyltriphenylphosphonium acetate-acetic acid complex), ethyltriphenylphosphonium phosphate, tetrabutylphosphonium chloride, tetrabutylphosphonium bromide, tetrabutylphosphonium iodide, tetrabutylphosphonium diacetate (tetrabutylphosphonium acetate-acetic acid complex), butyltriphenylphosphonium tetrabromobisphenate, butyltriphenylphosphonium bisphenate, butyltriphenylphosphonium bicarbonate, benzyltrimethylammonium chloride, tetramethylammonium hydroxide, triethylamine, tripropylamine, tributylamine, 2-methylimidazole, benzyldimethylamine, mixtures thereof and the like. Many of these catalysts are described in U.S. Pat. Nos. 3,306,872; 3,341,580; 3,379,684; 3,477,990; 3,547,881; 3,637,590; 3,843, 605; 3,948,855; 3,956,237; 4,048,141; 4,093,650; 4,131,633; 4,132,706; 4,171,420; 4,177,216 and 4,366,295, all of which are incorporated herein by reference.

If desired, the advancement reaction can be conducted in the presence of one or more solvents. Suitable such solvents include, for example, glycol ethers, aliphatic and aromatic hydrocarbons, aliphatic ethers, cyclic ethers, amides, combinations thereof and the like. Particularly suitable solvents include, for example, toluene, benzene, xylene, methyl ethyl ketone, diethylene glycol methyl ether, dipropylene glycol methyl ether, N,N-dimethylformamide, N-methylpyrrolidinone, N,N-dimethylacetamide, tetrahydrofuran, propylene glycol methyl ether, combinations thereof and the like. The solvents can be employed in amounts of from 0% to 300%, preferably from 20% to 150%, more preferably from 50% to 100% by weight based upon the total weight of the reactants. An aprotic solvent, such as N,N-dimethylformamide is most preferred.

Preferably, the sulfonated epoxy resin polymer of the present invention has a molecular weight of from 300 to 100,000, more preferably from 500 to 50,000 and, most preferably, from 1,000 to 20,000.

The sulfonated epoxy resin polymer used in the present invention contains unreacted terminal epoxide groups. The second step (B) of the process of the present invention is the hydrolysis of the sulfonated epoxy resin polymer reaction product of step (A) to form an α-glycol containing sulfonated epoxy resin composition. The hydrolysis preferably is conducted by contacting said reaction product of step A with water. Optionally the water used for the hydrolysis may contain one or more basic acting agents, one or more acidic acting agents, one or more catalysts or mixtures thereof. However, it is most preferred to only use water for the hydrolysis reaction, especially in light of the current emphasis on processes employing so-called "green chemistry". Additional optional materials which may be used in the hydrolysis reaction include one or more solvents. Reaction conditions useful for the hydrolysis of the epoxide group in water are reported by Wang, et al, Journal of Organic Chemistry, 73, 2270-2274 (2008).

Basic acting substances which may optionally be employed in the hydrolysis of the sulfonated epoxy resin polymer reaction product of step (A) include alkali metal hydroxides, alkaline earth metal hydroxides, carbonates, bicarbonates, and any mixture thereof, and the like. More specific examples of the basic acting substance include sodium hydroxide, potassium hydroxide, lithium hydroxide, calcium hydroxide, barium hydroxide, magnesium hydroxide, manganese hydroxide, sodium carbonate, potassium carbonate, lithium carbonate, calcium carbonate, barium carbonate, magnesium carbonate, manganese carbonate, sodium bicarbonate, potassium bicarbonate, magnesium bicarbonate, lithium bicarbonate, calcium bicarbonate, barium bicarbonate, manganese bicarbonate, and any combination thereof.

Acidic acting substances which may optionally be employed in the hydrolysis of the sulfonated epoxy resin advancement reaction product include most any inorganic or organic acids, such as protic acids, solid Lewis acids, solid-supported Lewis acids, and any mixture thereof, and the like. More specific examples of the acidic acting substance include sulfuric acid, hydrochloric acid, acetic acid, perchloric acid (Fieser and Fieser, *Reagents for Organic Synthesis*, 1, 796-797, John Wiley and Sons, Inc., NY, N.Y. (1967)]; ferric perchlorate [Salehi, et al, Synthetic Communications, 30, 16, 2967 (2000)]; magnesium hydrogen sulfate [Salehi, et al, Synthetic Communications, 33, 17, 3014 (2003)]; bismuth (III) chloride [Mohammadpoor-Baltork, et al, Synthetic Communications, 30, 13, 2365 (2000)]; iron (III) chloride hexahydrate supported on chromatographic silica gel ($SiO_2$) [Iranpoor, et al, Synthesis, 12, 1473 (1996)]; Iron (III) trifluoroacetate [Iranpoor and Adibi, Bulletin of the Chemical Society of Japan, 73, 3, 675 (2000)]; sulfonated tetrafluoroethylene based fluoropolymer-copolymer (Nafion-H) [Olah, et al, Synthesis, 1981, 4, 280 (1981)]; and any combination thereof. The herein above references additionally provide typical reaction times, temperatures, and operable amounts for each respective acidic acting substance. Parker and Isaacs [Chemical Reviews, 59, 4, 737-799 (August, 1959)] provide extensive additional information of the hydrolysis of the epoxide group. Perchloric acid is most preferred as the acidic acting substance.

While the amount of basic acting or acidic acting substance may vary due to factors such as composition, reaction time and reaction temperature, the lowest amount of basic acting or acidic acting substance required to produce the desired effect is preferred. In general, the basic acting or acidic acting substance may be used in an amount of from 0.001 wt % to 20 wt %, preferably, from 0.01 wt % to 10 wt %, and more preferably, from 0.1 wt % to 5 wt % based on the total weight of the sulfonated epoxy resin advancement reaction product precursor to the hydrolysis product of the present invention.

Catalysts which may optionally be employed in the process for the hydrolysis of the sulfonated epoxy resin advancement reaction product include, for example, carbon tetrabromide [Yadav, et al, Synthesis, 17, 2897 (2005)]; tetrabutylammonium bisulfate [Fan, et al, Organic and Bimolecular Chemistry, 1, 1565 (2003)]; ammonium decatungstocerate [Mirkhani, et al, Tetrahedron, 59, 41, 8213 (Oct. 6, 2003)]; iodine and iodine supported on polyvinylpyrrolidone [Iranpoor, et al, Canadian Journal of Chemistry, 75, 12, 1913 (1997)]; Ce IV as ceric ammonium nitrate [Iranpoor, et al, Tetrahedron, 47, 47, 9861 (Dec. 2, 1991)]. The herein above references additionally provide typical reaction times, temperatures, and operable amounts for each respective catalyst.

While the amount of catalyst may vary due to factors such as catalyst composition, reaction time and reaction temperature, the lowest amount of catalyst required to produce the desired effect is preferred. In general, the catalyst may be used in an amount of from 0.001 wt % to 5 wt %, preferably, from 0.01 wt % to 3 wt %, and more preferably, from 0.1 wt % to 2 wt % based on the total weight of the sulfonated epoxy resin advancement reaction product precursor to the hydrolysis product of the present invention.

In the hydrolysis reaction, water may function as both a solvent and a reactant. A solvent in addition to water optionally may also be used in the process for hydrolysis of the epoxide groups in the advancement reaction product. The solvent should be inert to any materials used in the hydrolysis process, including for example, reactants, optional basic acting agents, optional acidic acting agents, optional catalysts, intermediate products formed during the process, and final products. Solvents which may optionally be employed in the hydrolysis process include, for example, aliphatic and aromatic hydrocarbons, halogenated aliphatic hydrocarbons, aliphatic ethers, aliphatic nitriles, cyclic ethers, ketones, amides, sulfoxides, aliphatic or cycloaliphatic alcohols, aliphatic or cycloaliphatic diols, and any combination thereof. Aliphatic or cycloaliphatic alcohols or diols are most preferred as the solvent.

More specific examples of the solvents which may optionally be employed include pentane, hexane, octane, toluene, xylene, acetone, methylethylketone, methylisobutylketone, dimethylsulfoxide, diethyl ether, tetrahydrofuran, 1,4-dioxane, dichloromethane, chloroform, ethylene dichloride, methyl chloroform, ethylene glycol dimethyl ether, acetonitrile, ethanol, propanol, isopropanol, tertiary-butanol, ethylene glycol, propylene glycol, cyclohexanol, N,N-dimethylformamide; N,N-dimethylacetamide; and any combination thereof.

If a solvent other than water is employed in the hydrolysis, the minimum amount of solvent needed to achieve the desired result is preferred. In general, the solvent may be present in the process from 1 wt % to 250 wt %, preferably, 2 wt % to 100 wt %, and more preferably, 5 wt % to 50 wt % based on the total weight of the sulfonated epoxy resin advancement reaction product. The solvent (including water) may be removed from the final product at the completion of the hydrolysis using conventional methods, such as vacuum distillation.

One embodiment of the present invention includes the amphoteric amino sulfonate formed by reacting one or more $\alpha$-glycol containing sulfonated epoxy resin composition of the present invention and one or more acidic acting substances.

An additional embodiment of the present invention includes solutions, dispersions, suspensions or mixtures comprising one or more (I) $\alpha$-glycol containing sulfonated epoxy resin composition of the present invention with (II) water, optionally one or more (III) water miscible organic compounds, optionally one or more (IV) alkaline acting substances, and optionally one or more (V) acidic acting substances, and optionally one or more (VI) inorganic salts.

Yet a further embodiment of the present invention includes a relative permeability modifier comprising one or more $\alpha$-glycol containing sulfonated epoxy resin composition and/or one or more amphoteric amine sulfonates of the present invention.

Aqueous solutions of the $\alpha$-glycol containing sulfonated epoxy resin composition of the present invention can exhibit a cloud point or lower critical solution temperature (LCST), such that an aqueous solution of the $\alpha$-glycol containing sulfonated epoxy resin polymer flows at some temperature below the boiling point of water, preferably room temperature, and becomes more viscous and/or gels with the possible optical transition from clear-to-hazy/opaque/turbid at more elevated temperatures. The term cloud point is a term that can be used to describe the optical transition. As used herein, the term "LCST" describes the temperature at which the polymer solution experiences a phase transition going from one phase (homogeneous solution) to at least a two-phase system (a polymer rich phase and a more solvent rich phase) as the solution temperature increases. The cloud point or LCST can be changed by the addition of salts, acids, or bases to the aqueous solutions of the sulfonated epoxy resin polymer. The cloud point or LCST can also be changed as a function of concentration of the $\alpha$-glycol containing sulfonated epoxy resin composition in aqueous solutions as well as the molecular weight of the $\alpha$-glycol containing sulfonated epoxy resin polymer.

Another embodiment of the present invention is a method of modifying the permeability to water of a subterranean formation comprising, consisting essentially of, consisting of the step of injecting into the subterranean formation an aqueous composition comprising the $\alpha$-glycol containing sulfonated epoxy resin composition disclosed herein above.

We have found that the $\alpha$-glycol containing sulfonated epoxy resin compositions of the present invention are effective at reducing the amount of water recovered from subterranean, hydrocarbon-bearing formations, thereby increasing the production rate of hydrocarbons from the formation. The compositions of this invention are particularly effective at decreasing the water permeability with little effect on the oil permeability. The polymers of this invention are also particularly effective for use in gas and oil wells that operate at temperatures higher than about 200° F. where polymers such as polyacrylamide (PAM), hydrolyzed polyacrylamide (HPAM) and ester-containing polymers are less effective due to hydrolysis of the ester or amide functionality.

Water conformance is the application of processes in reservoirs and boreholes to reduce water production and enhance oil recovery. Water conformance can be applied to locations in the well where there is a separate oil producing zone adjacent to a water producing zone, and where the reservoir has a high water saturation along with oil. It can be applied in reservoirs of different matrix. For example, water conformance can be applied to sandstone and limestone (carbonate) matrix. The $\alpha$-glycol containing sulfonated epoxy resin compositions of the present invention can be used in any of these water conformance applications.

One embodiment of the present invention is a method of modifying the permeability to water of a subterranean formation comprising injecting into the subterranean formation an aqueous composition comprising from about 0.005 percent to about 2 percent, by volume, of a $\alpha$-glycol containing sulfonated epoxy resin composition of the present invention, wherein the $\alpha$-glycol containing sulfonated epoxy resin composition is prepared as disclosed herein above.

In one embodiment of the present invention, a solution of the $\alpha$-glycol containing sulfonated epoxy resin composition in water can be prepared by adding one or more water miscible solubilizing agents to an aqueous solution of the sulfonated epoxy resin polymer.

A further embodiment of the present invention includes the amphoteric amino sulfonate polymer formed by reacting one or more (I) $\alpha$-glycol containing sulfonated epoxy resin polymers of the present invention and one or more (II) acidic acting substances.

An aqueous $\alpha$-glycol containing sulfonated epoxy resin polymer/solubilizing agent solution can also be prepared by synthesizing the sulfonated epoxy resin polymer in a water miscible solvent and then diluting the reaction mixture with water. Suitable water miscible solvents are alcohols, amides, glycols, glycol ethers, such as isopropanol, butanol, 1,2-propylene glycol, ethylene glycol and hexylene glycol, N,N-dimethylformamide, N,N-dimethylacetamide, N-methylpyrrolidinone, ethylene glycol butyl ether, diethylene glycol methyl ether, dipropylene glycol methyl ether, di(propylene glycol) methyl ether, propylene glycol phenyl ether, propylene glycol methyl ether, mixtures thereof and the like.

In one embodiment, the $\alpha$-glycol containing sulfonated epoxy resin composition of the present invention may be added to an aqueous salt solution commonly used to prevent clay swelling or migration. Any salt that can prevent clay swelling or migration can be used. Preferred clay stabilization salts are KCl, NaCl, NaBr and $NH_4Cl$. The concentration of the salt depends on the clay. Typical concentrations of KCl used in the field vary from about 1 to about 6 weight percent, preferably about 1 to about 2 weight percent. Typical concentrations of NaCl vary from about 10 weight percent to saturation. NaBr concentrations up to 11.4 pounds/gallon have been used. Typical concentrations of ammonium chloride vary from about 0.5 to about 2 weight percent.

The α-glycol containing sulfonated epoxy resin composition is added to the aqueous salt solution used to prevent clay swelling or migration at a concentration from about 0.005 weight percent to about 2 weight percent, preferably 0.02 weight percent to about 0.2 weight percent.

Accordingly, in another preferred aspect, this invention is an aqueous composition comprising about 0.005 to about 2 weight percent α-glycol containing sulfonated epoxy resin composition and about 1 to about 10 weight percent of one or more clay stabilization salts.

In another preferred aspect, the clay stabilization salt is selected from KCl, NaCl, NaBr and $NH_4Cl$.

The aqueous compositions comprising the α-glycol containing sulfonated epoxy resin composition of this invention are applied to the formation by forcing, injecting or pumping composition directly into the formation to be treated so that the polymer contacts or treats the formation or the desired portion of the formation to alter the permeability of the formation as desired.

Particulate material (e.g., sand, silica flour and asbestos) can also be added to or suspended in the aqueous composition.

The treatment of a subterranean formation through an oil well can be accomplished using one or more liquid spacers, preflushes or afterflushes, such as a dilute salt solution and/or an aqueous alkali metal halide solution, into the formation to pretreat or clean the formation, then injecting the aqueous composition of this invention in an amount calculated to contact the desired portion of the formation with the α-glycol containing sulfonated epoxy resin polymer.

In one embodiment of the method of the present invention, after the polymer preflush is injected and the fracturing treatment placed, the well is shut in for about 10 to 18 hours. In some cases this polymer preflush can be preceded by a solvent preflush that removes asphaltene and paraffin deposits in the formation.

The foregoing may be better understood by reference to the following examples, which are presented for purposes of illustration and are not intended to limit the scope of this invention.

EXAMPLES

In Examples 1 to 3 the following components are used:

"D.E.R.™ 332 Epoxy Resin" is a high purity bisphenol A diglycidyl ether having a titrated epoxide equivalent weight of 171.2 available from The Dow Chemical Company;

"N,N-DMF" is N,N-dimethylformamide which is 99.8% pure and is available anhydrous from Sigma-Aldrich Chemical;

"SURFONAMINE™ L-300 Amine" is a hydrophilic polyether monoamine comprising propylene oxide and ethylene oxide in a ratio of 8:58 having a molecular weight of approximately 3000 daltons available from Huntsman Corp.;
and "Aminomethanesulfonic acid, sodium salt" is 97% pure and is available from Sigma-Aldrich Chemical.

Example 1

Step A

D.E.R.™ 332 (5.7067 grams, 0.033 epoxide equivalent) and anhydrous N,N-dimethylformamide (N,N-DMF) (50 milliliters) are charged to a 500 milliliter, three neck, round bottom, glass reactor containing a magnetic stirring bar, under overhead dynamic nitrogen (0.5 liter per minute). The reactor is additionally outfitted with a condenser maintained at room temperature, a thermometer and overhead nitrogen inlet. D.E.R. 332 having a titrated epoxide equivalent weight of 171.2 is the high purity epoxy resin of bisphenol A (4,4'-isopropylidenediphenol) used. The reactants are weighed on a scale providing four decimal place accuracy. SURFONAMINE L-300 (4.7619 grams, 0.0033 amine hydrogen equivalent) solution in N,N-DMF (50 milliliters) is then added to the reactor followed by addition of dry aminomethanesulfonic acid, sodium salt (0.9982 grams, 0.0075 mole, 0.015 amine hydrogen equivalent) and N,N-DMF (250 milliliters). Heating of the resultant 25° C. stirred mixture commenced after placing a heating mantle under the reactor and activating the temperature controller. After 54 minutes 145° C. is attained and a hazy solution formed. Heating continued to 148° C. giving a boiling hazy solution. The reaction is held for the next 21 hours at 148 to 149° C. to provide an amber colored hazy solution. The hazy solution is removed from the reactor and rotary evaporated to a final temperature of 150° C. and a final vacuum of 2.0 mm Hg to give 11.54 grams of a tacky, viscous, amber colored, slightly hazy liquid at room temperature.

The product is fully soluble at room temperature in the acetic acid and dichloromethane solvents employed for epoxide titration. Epoxide titration of a sample of the product gave an apparent epoxide equivalent weight (EEW) of 525.3.

Step B

The bisphenol A epoxy resin—aminomethanesulfonic acid (sodium salt)—SURFONAMINE L-300 oligomeric product (11.20 grams) from A. above and DI water (400 milliliters) are charged to a 1 liter, single neck, round bottom, glass reactor containing a magnetic stirring bar. The reactor is additionally outfitted with a Claisen adaptor, a forced air cooled condenser, and a thermometer. Heating of the resultant 23° C. stirred mixture commenced after placing a heating mantle under the reactor and activating the temperature controller. After 14 minutes 66° C. is attained and an opaque brown colored solution formed. Heating continued and after a cumulative 16 minutes 75° C. is attained and a milky, opaque tan colored mixture formed. After a cumulative 32 minutes 100° C. is attained and an amber colored oil and water mixture formed. The reaction is held for 7 days at 100° C. The amber colored oil and water mixture is removed from the reactor and rotary evaporated to a final temperature of 150° C. and a final vacuum of 2.0 mm Hg to give a tacky, viscous, amber colored, liquid at room temperature. Epoxide titration of a sample of the product gave an apparent EEW of 2237 (note: the crystal violet indicator in the solution before titration gave a blue color instead of the usual violet color observed for titration of epoxy resin of bisphenol A). The product is dissolved in N,N-DMF (250 milliliters) then DI water (75 milliliters) is added to the stirred solution. The resultant solution is heated to 100° C. and held for 15 hours. The amber colored solution is removed from the reactor and rotary evaporated to a final temperature of 150° C. and a final vacuum of 2.0 mm Hg to give a tacky, viscous, amber colored, liquid at room temperature. A total of 11.16 grams of product is recovered (uncorrected for samples removed for analysis). Epoxide titration of a sample of the product demonstrated the EEW is unchanged (note: the crystal violet indicator in the solution before titration again gave a blue color instead of the usual violet color observed for titration of epoxy resin of bisphenol A).

Fourier transform infrared spectrophotometric (FTIR) analysis of a sample of the product as a film on a KCl plate is completed and compared against FTIR analysis results for D.E.R. 332 as a standard. The C—O stretching of the epoxide group at 915.5 cm$^{-1}$ in the standard is completely gone in the product. The combined C—O—C epoxide stretching and 1,4-substituted aromatic ring absorbance at 830.8 cm$^{-1}$ in the standard are reduced in relative intensity (830.4 cm$^{-1}$ in the product). The C—H stretching of the epoxide ring at 3056.1 cm$^{-1}$ in the standard is completely gone in the product. A strong, broad O—H stretching absorbance centered at 3390.5 cm$^{-1}$ appeared in the product but is not present in the standard. A broad C—N stretch is observed in the product at 1106 cm$^{-1}$. A C—O—C ether stretching absorbance is observed in the product at 1041 cm$^{-1}$ and in the standard at 1035 cm$^{-1}$. The product comprised the following nominal structural units:

is then added to the reactor followed by addition of dry aminomethanesulfonic acid, sodium salt (1.7302 grams, 0.013 mole, 0.026 amine hydrogen equivalent) and N,N-DMF (250 milliliters). Heating of the resultant 24° C. stirred mixture commenced after placing a heating mantle under the reactor and activating the temperature controller. After 31 minutes 145° C. is attained and a hazy solution formed. Heating continued to 148° C. giving a boiling slightly hazy solution. The reaction is held for the next 53.9 hours at 148 to 150° C. to provide an amber colored solution. The solution is removed from the reactor and rotary evaporated to a final temperature of 150° C. and a final vacuum of 1.0 mm Hg to give 11.51 grams of a tacky, viscous, amber colored, transparent, liquid at room temperature.

The product is fully soluble at room temperature in the acetic acid and dichloromethane solvents employed for epoxide titration. Epoxide titration of a sample of the product gave an apparent epoxide equivalent weight (EEW) of 1422.

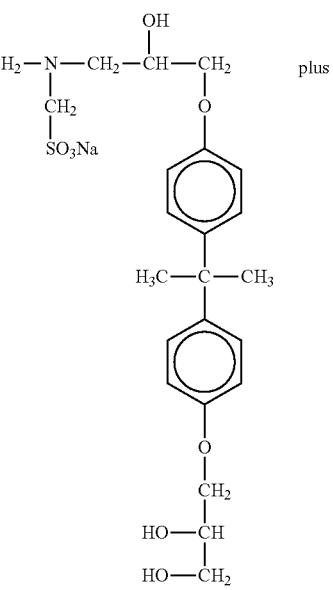

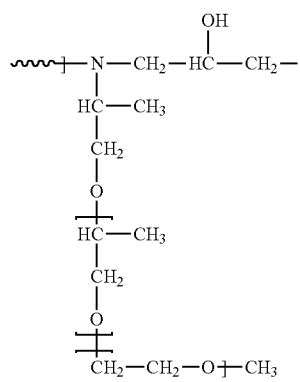

Example 2

Step A

D.E.R. 332 (5.7067 grams, 0.033 epoxide equivalent) and anhydrous N,N-dimethylformamide (N,N-DMF) (50 milliliters) are charged to a 500 milliliter, three neck, round bottom, glass reactor containing a magnetic stirring bar, under overhead dynamic nitrogen (0.5 liter per minute). The reactor is additionally outfitted with a condenser maintained at room temperature, a thermometer and overhead nitrogen inlet. D.E.R. 332 having a titrated epoxide equivalent weight of 171.2 is the high purity epoxy resin of bisphenol A (4,4'-isopropylidenediphenol) used. The reactants are weighed on a scale providing four decimal place accuracy. SURFONAMINE L-300 (4.7619 grams, 0.0033 amine hydrogen equivalent) solution in N,N-DMF (50 milliliters)

Step B

The bisphenol A epoxy resin—aminomethanesulfonic acid (sodium salt)—SURFONAMINE L-300 oligomeric product (11.22 grams) from A above and DI water (400 milliliters) are charged to a 1 liter, single neck, round bottom, glass reactor containing a magnetic stirring bar. The reactor is additionally outfitted with a Claisen adaptor, a forced air cooled condenser, and a thermometer. Heating of the resultant 23° C. stirred mixture commenced after placing a heating mantle under the reactor and activating the temperature controller. After 55 minutes 100° C. is attained and an opaque, medium brown colored mixture formed. The reaction is held for 5 days at 100° C. The amber colored oil and water mixture is removed from the reactor and rotary evaporated to a final temperature of 150° C. and a final vacuum of 2.0 mm Hg to give a tacky, viscous, amber colored, liquid at room temperature. A total of 11.17 grams of product is recovered (uncorrected sample removed for FTIR analysis).

FTIR analysis of a sample of the product as a film on a KCl plate is completed and compared against FTIR analysis results for D.E.R. 332 as a standard. The C—O stretching of the epoxide group at 915.5 cm$^{-1}$ in the standard is completely gone in the product. The combined C—O—C epoxide stretching and 1,4-substituted aromatic ring absorbance at 830.8 cm$^{-1}$ in the standard are reduced in relative intensity (830.6 cm$^{-1}$ in the product). The C—H stretching of the epoxide ring at 3056.1 cm$^{-1}$ in the standard is completely gone in the product. A strong, broad O—H stretching absorbance centered at 3416.1 cm$^{-1}$ appeared in the product but is not present in the standard. A broad C—N stretch is observed in the product at 1105.2 cm$^{-1}$. A C—OC ether stretching absorbance is observed in the product at 1041 cm$^{-1}$ and in the standard at 1035 cm$^{-1}$. The product comprised the following nominal structural units:

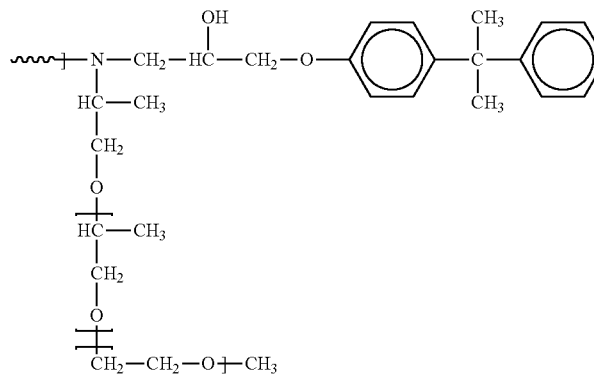

reactor and activating the temperature controller. After 59 minutes 148° C. is attained and a boiling, slightly hazy solution formed. The reaction is held for the next 55.7 hours at 148 to 150° C. to provide an amber colored, slightly hazy solution. The slightly hazy solution is removed from the reactor and rotary evaporated to a final temperature of 150° C. and a final vacuum of 1.0 mm Hg to give 11.74 grams of a tacky, viscous, amber colored, transparent liquid at room temperature comprising the nominal structural units given in Example 2 Step B. The product is fully soluble at room temperature in the acetic acid and dichloromethane solvents employed for epoxide titration. Epoxide titration of a sample of the product gave an apparent EEW of 1192.

Step B

The bisphenol A epoxy resin—aminomethanesulfonic acid (sodium salt)—SURFONAMINE L-300 oligomeric product (11.60 grams) from A above and DI water (400

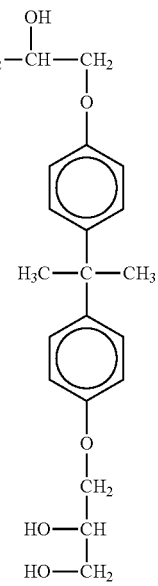

Example 3

Step A

D.E.R. 332 (5.7067 grams, 0.033 epoxide equivalent) and anhydrous N,N-dimethylformamide (N,N-DMF) (50 milliliters) are charged to a 500 milliliter, three neck, round bottom, glass reactor containing a magnetic stirring bar, under overhead dynamic nitrogen (0.5 liter per minute). The reactor is additionally outfitted with a condenser maintained at room temperature, a thermometer and overhead nitrogen inlet. D.E.R. 332 having a titrated epoxide equivalent weight of 171.2 is the high purity epoxy resin of bisphenol A (4,4'-isopropylidenediphenol) used. The reactants are weighed on a scale providing four decimal place accuracy. SURFONAMINE L-300 (4.7619 grams, 0.0033 amine hydrogen equivalent) solution in N,N-DMF (50 milliliters) is then added to the reactor followed by addition of dry aminomethanesulfonic acid, sodium salt (1.4973 grams, 0.01125 mole, 0.0225 amine hydrogen equivalent) and N,N-DMF (250 milliliters). Heating of the resultant 25° C. stirred mixture commenced after placing a heating mantle under the milliliters) are charged to a 1 liter, single neck, round bottom, glass reactor containing a magnetic stirring bar. The reactor is additionally outfitted with a Claisen adaptor, a forced air cooled condenser, and a thermometer. Heating of the resultant 23° C. stirred mixture commenced after placing a heating mantle under the reactor and activating the temperature controller. After 125 minutes 100° C. is attained and an opaque, light brown colored mixture formed. The reaction is held for 5 days at 100° C. The amber colored oil and water mixture is removed from the reactor and rotary evaporated to a final temperature of 150° C. and a final vacuum of 2.0 mm Hg to give a tacky, viscous, amber colored, liquid at room temperature. A total of 12.10 grams of product is recovered.

FTIR analysis of a sample of the product as a film on a KCl plate is completed and compared against FTIR analysis results for D.E.R. 332 as a standard. The C—O stretching of the epoxide group at 915.5 cm$^{-1}$ in the standard is completely gone in the product. The combined C—O—C epoxide stretching and 1,4-substituted aromatic ring absorbance at 830.8 cm$^{-1}$ in the standard are reduced in relative intensity (831.8 cm$^{-1}$ in the product). The C—H stretching of the epoxide ring at 3056.1 cm$^{-1}$ in the standard is completely gone in the product. A strong, broad O—H stretching absorbance centered at 3398.8 cm$^{-1}$ appeared in the product but is not present in the standard. A broad C—N stretch is observed in the product at 1107.8 cm$^{-1}$. A C—O—C ether stretching absorbance is observed in the product at 1039.3 cm$^{-1}$ and in the standard at 1035 cm$^{-1}$. The product comprised the following nominal structural units:

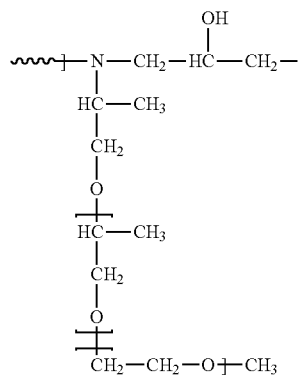

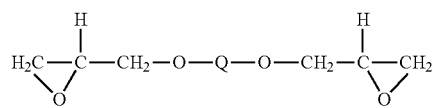

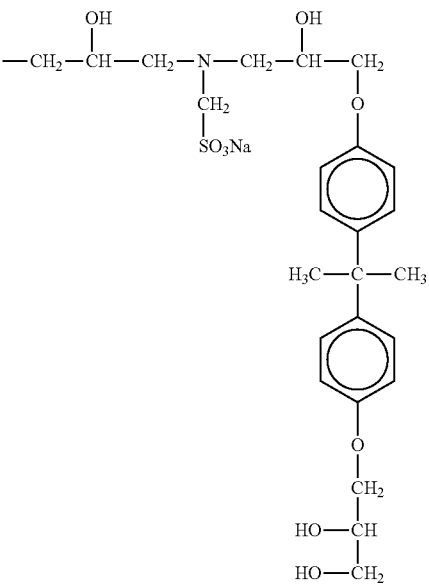

What is claimed is:

1. A method of modifying the permeability to water of a subterranean formation comprising the step of injecting into the subterranean formation an aqueous composition comprising from about 0.005 percent to about 2 percent, by weight, of an α-glycol containing sulfonated epoxy resin composition wherein the α-glycol containing sulfonated epoxy resin composition is made by:

(A) forming a sulfonated epoxy resin polymer reaction product by reacting
  (i) an epoxide-containing compound having an average of more than one epoxide group per molecule,
  (ii) a primary amino sulfonate,
  (iii) optionally a primary monoamine alkylene oxide oligomer,
  and
  (iv) optionally an epoxide reactive compound selected from a primary monoamine, a secondary diamine, a monohydroxyalkyl primary monoamine, a dihydroxyalkyl primary monoamine, a trihydroxyalkyl primary monoamine, a monohydroxycycloalkyl primary monoamine, a dihydroxycycloalkyl primary monoamine, or a trihydroxycycloalkyl primary monoamine
and
(B) converting unreacted epoxy groups in the reaction product from step (A) to α-glycol groups by hydrolysis.

2. The method of claim 1 wherein
(i) the epoxide-containing compound is represented by a formula I, below:

where Q is selected from a divalent aromatic group —Ar—; Ar-L-Ar, wherein L is selected from a direct bond, C$_1$ to C$_8$ alkylene, —SO$_2$—, —S—, >C=O, or —O—; a divalent cycloaliphatic group K having from 4 carbons to 8 carbons, or —R$_1$—K—R$_2$— where R$_1$ and R$_2$ are independently a C$_1$ to C$_3$ alkylene group;

(ii) the primary amino sulfonate is represented by a formula II, below:

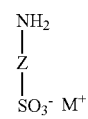

wherein Z is an aliphatic, cycloaliphatic, polycycloaliphatic, or aromatic hydrocarbon group optionally substituted with one or more alkyl groups
and
M is any monovalent cation;
and
(iii) if present, the primary monoamine alkylene oxide oligomer is represented by a formula III, below:

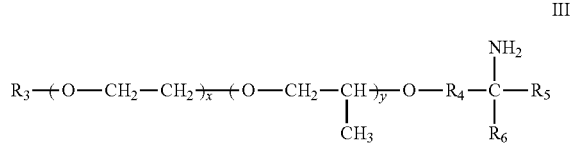

wherein $R_3$ is —H, $C_1$ to $C_{12}$ alkyl or cycloalkyl,
$R_4$ is a covalent bond, $C_1$ to $C_{12}$ alkyl or cycloalkyl,
$R_5$ and $R_6$ are independently —H, $C_1$ to $C_{12}$ alkyl or cycloalkyl,
and
x and y independently have a value from 0 to 400.

3. The method of claim 1 wherein an equivalent ratio of epoxide reactive groups in the primary monoamine sulfonate (ii), the optional primary monoamine alkylene oxide oligomer (iii), and the optional epoxide reactive compound (iv) to epoxy groups in the epoxide-containing compound (i) is 0.25:1 to 0.95:1.

4. The method of claim 1 wherein the α-glycol containing sulfonated epoxy resin composition has an average molecular weight of from 300 to 100,000.

5. The method of claim 1 wherein the primary monoamine alkylene oxide oligomer is present in an amount of from 1 to 15 percent, of amine hydrogen equivalents for reaction with epoxide equivalents of component (i), the epoxide-containing compound.

6. The method of claim 1 wherein the epoxide-containing compound is selected from diglycidyl ether of 4,4'-isopropylidenediphenol (bisphenol A); cis-1,3-cyclohexanedimethanol; trans-1,3-cyclohexanedimethanol; cis-1,4-cyclohexanedimethanol; or trans-1,4-cyclohexanedimethanol.

7. The method of claim 1 wherein the primary amino sulfonate is selected from sulfanilic acid, sodium salt; sulfanilic acid, potassium salt; aminomethanesulfonic acid, sodium salt; or aminomethanesulfonic acid, potassium salt.

8. The method of claim 2 wherein for the primary monoamine alkylene oxide oligomer is present and $R_3$ and $R_5$ are —$CH_3$, $R_4$ is —$CH_2$—, $R_6$ is —H, and x and y independently have a value from 0 to 75 with the proviso that at least one of x or y is equal to or greater than 1.

9. The method of claim 1 wherein the aqueous composition further comprises about 1 to about 10 weight percent of one or more clay stabilization salts.

10. The method of claim 9 wherein the clay stabilization salts are selected from KCl, NaCl, NaBr, sodium acetate and $NH_4Cl$.

* * * * *